(12) United States Patent
Salavati-Niasari et al.

(10) Patent No.: US 11,136,518 B2
(45) Date of Patent: Oct. 5, 2021

(54) CLEAN GASOLINE FROM A LIGHT HYDROCARBON FRACTION AND PREPARATION METHOD THEREOF

(71) Applicants: Masoud Salavati-Niasari, Kashan (IR); Samira Mandizadeh Talkhoncheh, Kashan (IR); Ali Salehabadi, Kashan (IR)

(72) Inventors: Masoud Salavati-Niasari, Kashan (IR); Samira Mandizadeh Talkhoncheh, Kashan (IR); Ali Salehabadi, Kashan (IR)

(*) Notice: Subject to any disclaimer, the term of this patent is extended or adjusted under 35 U.S.C. 154(b) by 0 days.

(21) Appl. No.: 16/517,609

(22) Filed: Jul. 21, 2019

(65) Prior Publication Data
US 2019/0338210 A1   Nov. 7, 2019

Related U.S. Application Data

(60) Provisional application No. 62/731,913, filed on Sep. 16, 2018.

(51) Int. Cl.
*C10L 10/10* (2006.01)
*C10L 1/20* (2006.01)
(Continued)

(52) U.S. Cl.
CPC ............ *C10L 10/10* (2013.01); *B01J 23/005* (2013.01); *B01J 23/745* (2013.01);
(Continued)

(58) Field of Classification Search
CPC .... B01J 23/005; B01J 23/745; B01J 23/0013; B01J 23/1014; B01J 37/036; B01J 37/04; B01J 37/088; C10G 2300/1044; C10G 2300/1074; C10G 2300/1077; C10G 2300/202; C10G 2300/207;
(Continued)

(56) References Cited

U.S. PATENT DOCUMENTS

| | | | |
|---|---|---|---|
| 8,603,324 B2 | 12/2013 | Fan et al. | |
| 2003/0064389 A1* | 4/2003 | Goda | C07K 16/26 435/6.11 |

(Continued)

FOREIGN PATENT DOCUMENTS

| | | |
|---|---|---|
| CN | 101508912 B | 8/2009 |
| EP | 0664827 B1 | 8/1995 |

OTHER PUBLICATIONS

Hui Ge, Zegang Qiu, Zhenyu Ge, Wenpeng Han, Improvement of Hydrodesulfurization Catalysts Based on Insight of Nano Structures and Reaction Mechanisms, Nanotechnology in Oil and Gas Industries, 2017, 97-132.

(Continued)

*Primary Examiner* — Latosha Hines
(74) *Attorney, Agent, or Firm* — Bajwa IP Law Firm; Haris Zaheer Bajwa

(57) ABSTRACT

A method for producing a clean gasoline from a light hydrocarbon fraction is disclosed. The method includes two main steps including desulfurization of a light hydrocarbon fraction along with enhancing octane number of the desulfurized light hydrocarbon fraction. The octane number of the desulfurized hydrocarbon fraction is enhanced by applying a hormone-modified additive.

15 Claims, 14 Drawing Sheets

(51) Int. Cl.
  *C10L 1/185* (2006.01)
  *C10L 1/19* (2006.01)
  *C10G 27/12* (2006.01)
  *B01J 23/00* (2006.01)
  *B01J 23/745* (2006.01)
  *B01J 35/00* (2006.01)
  *B01J 37/04* (2006.01)
  *B01J 37/03* (2006.01)
  *B01J 37/08* (2006.01)

(52) U.S. Cl.
  CPC ......... *B01J 35/0013* (2013.01); *B01J 37/036* (2013.01); *B01J 37/04* (2013.01); *B01J 37/088* (2013.01); *C10G 27/12* (2013.01); *C10L 1/1852* (2013.01); *C10L 1/19* (2013.01); *C10L 1/205* (2013.01); *C10G 2300/1044* (2013.01); *C10G 2300/1074* (2013.01); *C10G 2300/1077* (2013.01); *C10G 2300/202* (2013.01); *C10G 2300/207* (2013.01); *C10G 2300/305* (2013.01); *C10L 2200/0423* (2013.01); *C10L 2270/023* (2013.01); *C10L 2290/544* (2013.01)

(58) Field of Classification Search
  CPC ... C10G 2300/305; C10G 27/12; C10L 10/10; C10L 1/1852; C10L 1/19; C10L 1/205; C10L 1/2225; C10L 2200/0423; C10L 2230/14; C10L 2270/023; C10L 2290/544
  See application file for complete search history.

(56) References Cited

U.S. PATENT DOCUMENTS

2014/0135541 A1    5/2014  Nicholas et al.
2014/0197074 A1*   7/2014  Bourane ............... B01J 23/80
                                                    208/211

OTHER PUBLICATIONS

David A. Vicic, William D. Jones, Hydrodesulfurization of Thiophene and Benzothiophene to Butane and Ethylbenzene by a Homogeneous Iridium Complex, Organometallics,, 1994, 198-203.

* cited by examiner

“CLEAN GASOLINE FROM A LIGHT HYDROCARBON FRACTION AND PREPARATION METHOD THEREOF”

CROSS REFERENCE TO RELATED APPLICATION

This application claims priority from U.S. Provisional Patent Application Ser. No. 62/731,913, filed on Sep. 16, 2018, entitled "PRODUCTION OF CLEAN GASOLINE FROM LIGHT FRACTION OF OIL CONDENSATE", which is incorporated by reference herein in its entirety.

TECHNICAL FIELD

The present disclosure generally relates to a clean gasoline with a high octane number and low sulfur content, and particularly to a method for producing the clean gasoline from light hydrocarbon fraction using a catalytic desulfurization method along with improving an octane number of the desulfurized hydrocarbon fraction using a hormone-modified additive.

BACKGROUND

Gasoline (gas or petrol, or benzine) is a transparent, petroleum-derived liquid from crude oil, shale oil, or coal liquid via fractional distillation that is used primarily as a fuel in internal combustion engines. The largest petroleum fraction is between C1 and C9, the so-called light hydrocarbons (LHs). Despite the fact that a wide range of petroleum fractions are light hydrocarbons, the use of these fractions for the production of gasoline also has some challenges. In an exemplary embodiment, challenges may include environmental problems like acid rains which can be attributed to a high sulfur content of light hydrocarbons and low vehicle performance caused by low octane number of light hydrocarbons, and so on.

One of these challenges is the issues that arise from the presence of sulfur in light hydrocarbon fractions. Light hydrocarbon fractions contain a variety of nonhydrocarbons, principally organosulfur compounds (OSCs) which is typically include thiophene, benzothiophene, dibenzothiophene, benzonaphthothiophene, dinaphthothiophene, and mercaptans. Hydrocarbon fractions also may contain inorganic sulfur such as elemental sulfur and sulfides. In transportation fuels, organosulfur compounds (OSCs) contribute to corroding parts of internal combustion in engines and poisoning catalytic converters upon combustion. The presence of OSCs also may lead to the formation of sulfur oxides (SOx) and sulfate particulate matters which are one of the major sources of air pollution. SOx is also known as a major precursor to acid rain.

Various approaches are utilized to decrease the sulfur content in hydrocarbon fractions. One of these methods is hydrodesulfurization (HDS) which is usually operated by applying a hydrodesulfurization catalyst in high temperature and high pressure. Two key issues of using HDS include decreasing gasoline quality by lowering its octane number and tough operating conditions. Tough operation conditions may include high temperature and high pressure which are hard to control, and it also requires expensive equipment to provide conditions. Another desulfurization technique that may utilized may include adsorptive desulfurization and bio-desulfurization (BDS) developed to produce clean gasoline. Adsorptive desulfurization is a cost-effective method which entails using sorbent material to remove refractory sulfur compounds from hydrocarbon fuels. Nevertheless, in this approach, the removal of sorbent is slow, and the adsorption capacity and the sorbent regeneration are not sufficient to be used for industrial application. Moreover, the accumulation of water-soluble end products of some of the microorganisms may hinder the use of BDS as an alternative technique for removing the refractory sulfur compounds using microorganisms at low temperature and pressure.

Another challenge for applying the light hydrocarbon fractions is a low octane number that is usually in the range of 60-66 therefore, resulting in inadequate burning performance. Octane number of the gasoline is the measure of a fuel's ability to resist "knocking" or "pinging" during combustion. So, fuel with an adequate octane number (that is usually more than 85), is required to prevent engine knock and consequently adequate burning performance. To enhance an octane number of the light hydrocarbon fractions some additives like octane boosters are usually used. There are different types of octane enhancer additives including lead, Methyl Tertiary Butyl Ether (MTBE), benzene, and toluene, however, due to the environmental concerns about the harmful side effects of applying these components, they have been removed from the fuel supply or decreased.

Hence, developing a fast, cost-effective, and environmentally friendly method to remove sulfur compounds in a moderate operation condition from light hydrocarbon fractions without decreasing the octane number of light hydrocarbon fractions, as well as, producing an environmentally friendly octane enhancer would be of great benefit. In addition, developing such a desulfurization method and producing an octane enhancer may lead to producing a clean gasoline without the need to add additives with aromatic and high-oxygen content compounds.

SUMMARY

This summary is intended to provide an overview of the subject matter of this application, and is not intended to identify essential elements or key elements of the subject matter, nor is it intended to be used to determine the scope of the claimed implementations. The proper scope of this application may be ascertained from the claims set forth below in view of the detailed description below and the drawings.

This summary is intended to provide an overview of the subject matter of this application, and is not intended to identify essential elements or key elements of the subject matter, nor is it intended to be used to determine the scope of the claimed implementations. The proper scope of this patent may be ascertained from the claims set forth below in view of the detailed description below and the drawings.

In one general aspect, the present disclosure is directed to an exemplary method for producing a clean gasoline from a light hydrocarbon fraction. The exemplary method may include forming a mixed phase by putting in contact a light hydrocarbon fraction with an oxidant in presence of a metal spinel-type oxide catalyst, the mixed phase may include a desulfurized hydrocarbon phase and a non-desulfurized hydrocarbon phase, the non-desulfurized hydrocarbon phase may include sulfur-containing compounds and the metal spinel-type oxide catalyst, separating the desulfurized hydrocarbon phase from the mixed phase, where the determined separated phase may include a sulfur content of less than 1 percent, obtaining a hormone-modified additive, and producing the clean gasoline through enhancing octane number of the desulfurized hydrocarbon phase by putting in contact the desulfurized hydrocarbon phase with the hormone-modified additive.

The above general aspect may have one or more of the following features. In an exemplary implementation, obtaining the hormone-modified additive may include producing a COOH functionalized additive by dispersing an additive in an acidic mixture, the acidic mixture may include one or more of $HNO_3$ and $H_2SO_4$, the additive may include carbon nanotubes, and obtaining the hormone-modified additive by adding a hormone to the COOH functionalized additive under stirring for 1-10 hours. In an exemplary implementation, producing the clean gasoline through enhancing the octane number of the desulfurized hydrocarbon phase by putting in contact the desulfurized hydrocarbon phase with the hormone-modified additive may include enhancing the octane number of the desulfurized hydrocarbon phase using one or more of triiodothyronine (T3)-modified additive, reverse triiodothyronine (rT3)-modified additive, and thyroxine (T4)-modified additive as the hormone-modified additive. In addition, in an exemplary implementation, producing the clean gasoline through enhancing the octane number of the desulfurized hydrocarbon phase by putting in contact the desulfurized hydrocarbon phase with the hormone-modified additive may include putting in contact the desulfurized hydrocarbon phase with the hormone-modified additive, the hormone-modified additive may include at least one of the following structural formulas (I), (II), and (III); where A and B comprise a —I and a —$NH_2$, respectively.

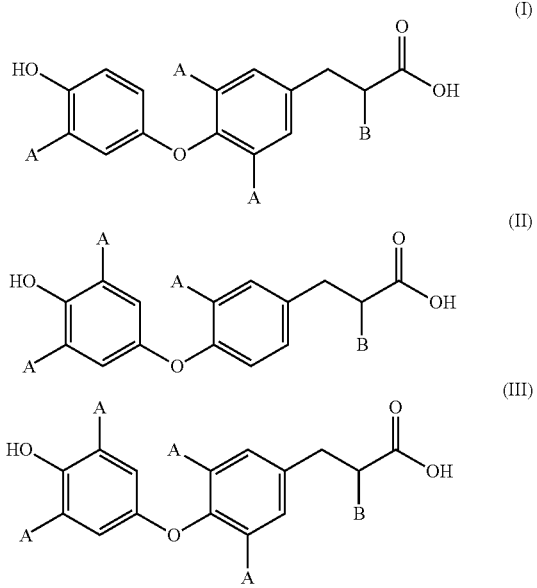

Furthermore, in an exemplary implementation, producing the clean gasoline through enhancing the octane number of the desulfurized hydrocarbon phase by putting in contact the desulfurized hydrocarbon phase with the hormone-modified additive may include enhancing the octane number of the desulfurized hydrocarbon phase by more than four units. Furthermore, in an exemplary implementation, producing the clean gasoline through enhancing the octane number of the desulfurized hydrocarbon phase by putting in contact the desulfurized hydrocarbon phase with the hormone-modified additive may include putting in contact the desulfurized hydrocarbon phase with 0.5-1.5% w/v of the hormone-modified additive. In an exemplary implementation, producing the clean gasoline through enhancing the octane number of the desulfurized hydrocarbon phase by putting in contact the desulfurized hydrocarbon phase with the hormone-modified additive may further include adding an organic additive to the desulfurized hydrocarbon phase, the organic additive may include one or more of ethanol, methanol, ethyl tert-butyl ether (ETBE), methyl tert-butyl ether (MTBE), and methyl acetate (MeOAc). In an exemplary implementation, forming the mixed phase by putting in contact the light hydrocarbon fraction with the oxidant in presence of the metal spinel-type oxide catalyst may include forming the mixed phase at a temperature in a range of 15° C. to 77° C. and a pressure in a range of 1 atm to 2 atm for 5-15 minutes. In addition, in an exemplary implementation, forming the mixed phase by putting in contact the light hydrocarbon fraction with the oxidant in presence of the metal spinel-type oxide catalyst may include putting in contact the light hydrocarbon fraction with the oxidant in presence of 0.5-2% w/v of the metal spinel-type oxide catalyst. Furthermore, in an exemplary implementation, forming the mixed phase by putting in contact the light hydrocarbon fraction with the oxidant in presence of the metal spinel-type oxide catalyst may include putting in contact the light hydrocarbon fraction with the oxidant may include one or more of air, ozone, oxygen, oxides of nitrogen, peroxides, hydroperoxides, and organic peracids in presence of the metal spinel-type oxide catalyst. In an exemplary implementation, forming the mixed phase by putting in contact the light hydrocarbon fraction with the oxidant in presence of the metal spinel-type oxide catalyst may include putting in contact the light hydrocarbon fraction includes a sulfur-containing hydrocarbon fraction with a boiling range of 30° C. to 100° C. with the oxidant in presence of the metal spinel-type oxide catalyst, the hydrocarbon fraction may include one or more of crude oil, shale oil, coal liquid, intermediate refinery products or their distillation fractions including naphtha, gas oil, vacuum gas oil, and vacuum residue. In an exemplary implementation, forming the mixed phase by putting in contact the light hydrocarbon fraction with the oxidant in presence of the metal spinel-type oxide catalyst may include putting in contact the light hydrocarbon fraction with the oxidant in presence of the metal spinel-type oxide catalyst with a formula of $AB_2O_4$, A and B may include elements comprising copper, iron, nickel, and any mixture thereof. In an exemplary implementation, the exemplary method of desulfurization of the light hydrocarbon fraction may further include regenerating the metal spinel-type oxide catalyst by treating the non-desulfurized hydrocarbon phase with at least one of hydrochloric acid and nitric acid. In an exemplary implementation, separating the desulfurized hydrocarbon phase from the mixed phase may include separating the desulfurized hydrocarbon phase from the mixed phase by one or more of decantation or applying a magnetic field.

In another general aspect, the present disclosure is directed to an exemplary clean gasoline including a desulfurized light hydrocarbon fraction, and one of the at least one hormone-modified additive, the exemplary hormone-modified additive may include carbon nanotubes and one or more of triiodothyronine (T3)-modified additive, reverse triiodothyronine (rT3)-modified additive, and thyroxine (T4)-modified additive.

In addition, in an exemplary implementation, the exemplary clean gasoline may include octane number more than 95. Furthermore, in an exemplary implementation, the exemplary clean gasoline may include the octane number more than 100. In an exemplary implementation, the exemplary clean gasoline may include a storage stability of 25 days.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
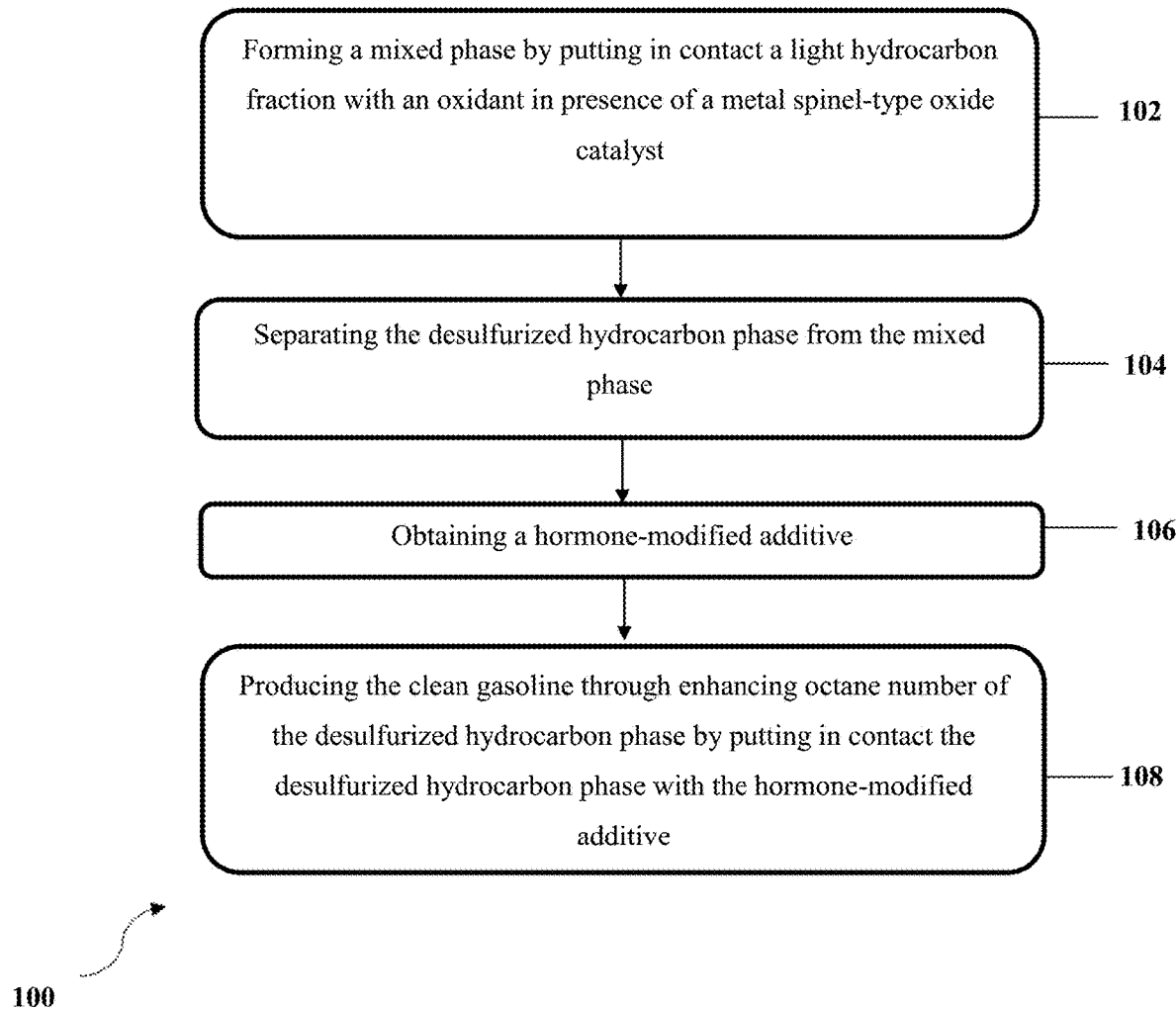
FIG. 1A illustrates a flowchart of an implementation of a general representation of the gasoline production method for producing a clean gasoline, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings. The following detailed description is, therefore, not to be taken in a limiting sense, and the scope of the present disclosure is defined only by the appended claims.

The following description is of exemplary embodiments only and is not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention.

The terms "comprises", "comprising", or any other variations thereof, are intended to cover a non-exclusive inclusion, such that one or more processes or composition/s or systems or methods proceeded by "comprises . . . a" does not, without more constraints, preclude the existence of other processes, sub-processes, composition, sub-compositions, minor or major compositions or other elements or other structures or additional processes or compositions or additional elements or additional features or additional characteristics or additional attributes.

The present disclosure describes an exemplary gasoline production method comprising two main steps. A first main step may comprise desulfurization of a light hydrocarbon fraction and the second main step may comprise enhancing octane number of a desulfurized light hydrocarbon fraction using a hormone-modified additive to produce a clean gasoline under atmospheric pressure and temperature. Some benefits from utilizing the exemplary gasoline production method described within the present disclosure may include, but are not limited to, developing a method to produce a clean gasoline with a low sulfur-content, high octane number, and high storage stability under atmospheric conditions. In addition, using a hormone as a bio substance for boosting the octane number of the desulfurized hydrocarbon fraction in the present gasoline production method may lead to producing environmentally friendly gasoline.

In an exemplary embodiment, an exemplary gasoline production method may result in production of an exemplary clean gasoline. In an exemplary embodiment, the term "clean" may refer to presence of some features like having a low sulfur content and a high octane number.

In an exemplary embodiment, an exemplary gasoline production method may result in production of an exemplary clean gasoline with high octane number. In an exemplary embodiment, the term "high" may refer to octane number of gasoline more than 90.

In an exemplary embodiment, produced clean gasoline utilizing an exemplary gasoline production method may include sulfur content of less than 1 percent, which may lead to reducing a negative impact of motor vehicles on air quality and public health.

In an exemplary embodiment, an exemplary gasoline production method may include enhancing the octane number of the desulfurized hydrocarbon phase by more than four units. Moreover, the produced clean gasoline produced utilizing an exemplary gasoline production method may have an octane number of more than 90.

In an exemplary embodiment, the storage stability of an exemplary produced clean gasoline may be in a range of 20-35 days.

In an exemplary embodiment, aspects and features of an exemplary gasoline production method based on the two main steps including desulfurization of the light hydrocarbon fraction to reach sulfur content of less than 1 percent and enhancing octane number of the desulfurized light hydrocarbon fraction at atmospheric conditions using a hormone-modified additive will be described in greater detail, below.

In an exemplary embodiment, chemical or elemental analysis, morphology, and operational properties of an exemplary clean gasoline, hormone-modified additive, and the metal spinel-type oxide catalyst may be evaluated and described in more detail in connection with specific exemplary implementations of the present disclosure.

Producing a Clean Gasoline from a Light Hydrocarbon Fraction

Sulfur and its compounds are naturally present in virtually all hydrocarbon fractions which are converted to sulfur oxides during combustion of gasoline or diesel fuels in internal combustion engines. Because of the damage sulfur oxides do to an engine and to the environment, there is a need for decreasing an amount of sulfur to trace levels during a gasoline production process. Moreover, light hydrocarbon fractions have low octane numbers of 60-66 which do not have the required characteristics of motor fuel. There are three main types of gasoline grades with various octane number ranges. In an exemplary embodiment, regular grade gasoline has an octane number between 85 and 88, with the average being 87, midgrade (or plus) gasoline has an octane number of 88 to 90, with the average being 89, and premium grade gasoline has an octane number that is larger than 90, with the average being 92. Thus, for utilizing light hydrocarbon fractions as motor fuels, it is necessary to apply a method that will raise the octane number more than 85.

In an exemplary embodiment, an exemplary gasoline production method may include two steps: desulfurization of a light hydrocarbon fraction and enhancing octane number of a desulfurized light hydrocarbon fraction. In an exemplary embodiment, desulfurization may refer to a chemical process for removal of sulfur from a material. This exemplary chemical process may include either the removal of sulfur from a molecule (for example, A=S→A) or the removal of sulfur compounds from a mixture.

In an exemplary embodiment, FIG. 1A illustrates an exemplary flowchart of a general representation of the gasoline production method 100 for producing a clean gasoline, consistent with one or more exemplary embodiments of the present disclosure. As illustrated in FIG. 1A, the exemplary gasoline production method may include step 102, comprising of forming a mixed phase by putting in contact a light hydrocarbon fraction with an oxidant in the presence of 0.5-2% w/v of metal spinel-type oxide catalyst phase. In an exemplary embodiment, the mixed phase may include a desulfurized hydrocarbon phase and a non-desulfurized hydrocarbon phase. In an exemplary embodiment, the non-desulfurized hydrocarbon phase may include both sulfur-containing compounds and the metal spinel-type oxide catalyst. Step 104 may include separating the desulfurized hydrocarbon phase from the mixed phase by one or more of decantation or applying a magnetic field, where the determined separated phase may include a sulfur content of less than 1 percent. Step 106 may include obtaining a hormone-modified additive, and step 108 may include producing the clean gasoline through enhancing octane number of the desulfurized hydrocarbon phase by putting in contact the desulfurized hydrocarbon phase with 0.5-1.5% w/v of the hormone-modified additive. In an exemplary embodiment, the hormone-modified additive may include one or more of triiodothyronine (T3)-modified additive, reverse triiodothyronine (rT3)-modified additive, and thyroxine (T4)-modified additive.

Figure 1B:
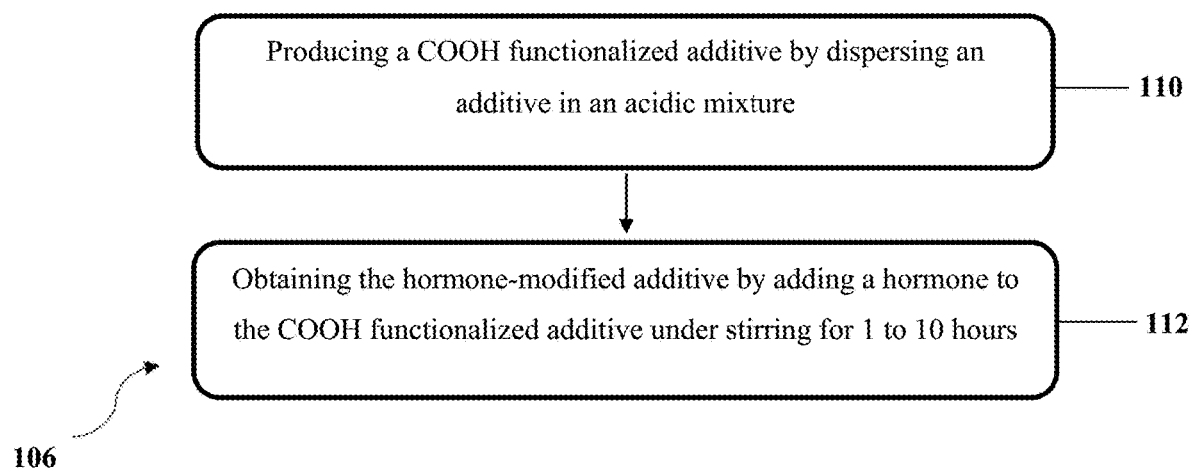
FIG. 1B illustrates a flowchart of an implementation of a general representation of the modifying process for obtaining a hormone-modified additive, consistent with one or more exemplary embodiments of the present disclosure.

In an exemplary embodiment, FIG. 1B illustrates an exemplary flowchart of a general representation of an additive modifying process in detail for obtaining the hormone-modified additive 106, consistent with one or more exemplary embodiments of the present disclosure. As illustrated in FIG. 1B, an exemplary additive modifying process may include producing a COOH functionalized additive by dispersing an additive in an acidic mixture, and obtaining the hormone-modified additive by adding a hormone to the COOH functionalized additive under stirring for 1-10 hours. In an exemplary embodiment, the acidic mixture may include one or more of $HNO_3$ and $H_2SO_4$. In an exemplary embodiment, the additive may include carbon nanotubes.

Desulfurization of the Light Hydrocarbon Fraction

With further respect to step 102, forming the mixed phase by putting in contact the light hydrocarbon fraction with the oxidant in presence of the metal may include forming the mixed phase by putting in contact the light hydrocarbon fraction with the oxidant in presence of the metal spinel-type oxide catalyst with a formula of $AB_2O_4$, where A and B may be elements including one or more of copper, iron, and nickel. In an exemplary embodiment, the metal spinel-type oxide catalyst may be synthesized via a wet chemical method, such as, but are not limited to, sol-gel technique in the presence of fructose as the fuel. The catalytic properties of metal spinel-type oxide catalyst may strongly depend on the nature of A and B ions, their charge, as well as their distribution between the octahedral Oh and tetrahedral Td sites. There may be a rapid electron exchange between $M^{2+}$ and $M^{3+}$ ions in inverse and mixed spinel structures. In an exemplary embodiment, the organometallic phase transfer agents (PTAs) may replace the metal spinel and PTAs may enhance the extent of interactions of the phases at the border line (water-organic) during desulfurization process. In an exemplary embodiment, an average particle size of the metal spinel-type oxide catalyst may be in a nanometer range. In an exemplary embodiment, enzymes or any biocatalyst may be applied as catalyst in forming the mixed phase by putting in contact the light hydrocarbon fraction with the oxidant in presence of the catalyst.

In an exemplary embodiment, the light hydrocarbon fraction in the exemplary gasoline production method may include a sulfur-containing hydrocarbon fraction with a boiling temperature range of 30° C. to 100° C. Also, the hydrocarbon fraction may include one or more of crude oil, shale oil, coal liquid, intermediate refinery products or their distillation fractions including naphtha, gas oil, vacuum gas oil, and vacuum residue.

In an exemplary embodiment, the applied oxidant for desulfurizing the light hydrocarbon fraction may include one or more of air, ozone, oxygen, oxides of nitrogen, peroxides, hydroperoxides, and organic peracids.

In an exemplary embodiment, the exemplary clean gasoline production method may include forming the mixed phase by putting in contact the light hydrocarbon fraction with the oxidant in presence of the metal spinel-type oxide catalyst at a temperature in a range of 15° C. to 77° C. and a pressure in a range of 1 atm to 2 atm for 5 to 15 minutes.

In an exemplary embodiment, the exemplary clean gasoline production method may further include regenerating the applied catalyst by treating the non-desulfurized hydrocarbon phase using acid solid liquid extraction method. In an exemplary method, the non-desulfurized hydrocarbon phase may be put in contact with a mixture of hydrochloric acid and nitric acid as oxidizing agent for about 30 minutes. Therefore, by regenerating the utilized catalyst, the catalyst may be applied at least 3 times for desulfurization of the light hydrocarbon fraction in an exemplary clean gasoline production method.

In an exemplary embodiment, the non-desulfurized hydrocarbon phase may include sulfur-containing compounds and the metal spinel-type oxide catalyst.

Mechanism of Enhancing the Octane Number of the Desulfurized Light Hydrocarbon Fraction In an exemplary embodiment, the exemplary gasoline production method may include enhancing the octane number of the desulfurized hydrocarbon phase using a hormone-modified additive, consistent with exemplary process of step 108. In an exemplary embodiment, the additive may include carbon nanotubes (CNTs).

CNTs may refer to allotropes of carbon that are entirely composed of $sp^2$ bonds. Their chemical structure lack oxygen- and nitrogen-containing polar groups, resulting in high hydrophobicity of CNTs. Hence, CNTs naturally may have less interaction with polar solvents and polymeric materials and may tend to aggregate owing to their own strong π-π interaction. Therefore, organo-modification may be critical and necessary for applying CNTs. In an exemplary embodiment, modifying CNTs may start with oxidation of CNTs bundles using strong acid treatment, such as, but are not limited to, nitric acid and sulfuric acid treatments, to obtain the COOH functionalized CNTs. Oxidation of CNT bundles may generate carbonyl acid groups on the surface of CNTs, which may act as versatile chemical groups for further functionalization of CNTs. In an exemplary implementation, modifying of the CNTs may followed by adding a hormone to the COOH functionalized CNTs under stirring for 1-10 hours to obtain the hormone-modified additive.

In an exemplary embodiment, the exemplary gasoline production method may include enhancing the octane number of the desulfurized hydrocarbon phase using a hormone as a bio agent in order to modify the additive resulting in the production of an environmentally friendly gasoline through the exemplary gasoline production method of this disclosure. In an exemplary embodiment, the hormone-modified additive may include an additive and a hormone. In an exemplary embodiment, the hormone may include one or more of triiodothyronine (T3)-modified, reverse triiodothyronine (rT3)-modified, and thyroxine (T4)-modified. The hormones Triiodothyronine (T3), reverse triiodothyronine (rT3), and Thyroxine (T4) may be naturally extractable from the serum or chemically synthesized in the laboratory. Each molecule of T3, rT3, and T4 hormones is a group of chemically similar substances with functional groups. The exemplary functional groups may include iodine, amine, and carboxylic acid in which T3 and rT3 contain 3 iodide groups and T4 contains 4 iodide groups. In an exemplary embodiment, some of the functional groups of the hormone-modified additive may be inactive in a process of additive modification, but the remaining ones or free functional groups including iodine, amine, and carboxylic acid may be still available to react with compounds in gasoline and create weak links which may affect boosting of an octane number of the exemplary produced gasoline.

In an exemplary embodiment, the hormone may include the following structural formulas (I), (II), and (III); where A and B may include one —I group and one —$NH_2$ group, respectively.

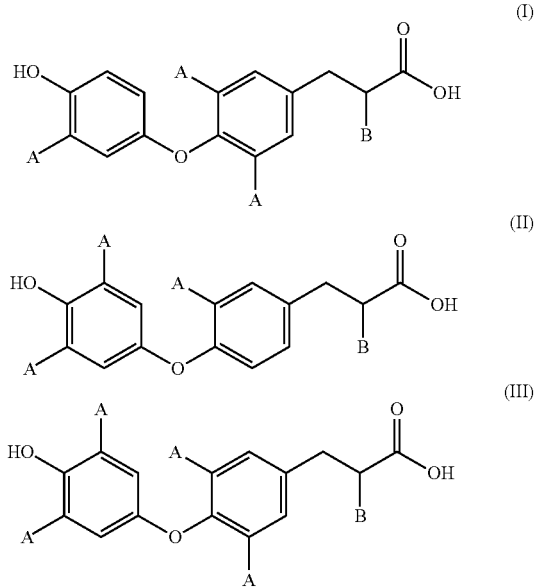

In an exemplary embodiment, enhancing the octane number of the desulfurized hydrocarbon phase may further include adding an organic additive to the desulfurized hydrocarbon phase before putting in contact the desulfurized hydrocarbon phase with the hormone-modified additive for further boosting the octane number of the desulfurized hydrocarbon phase. In an exemplary embodiment, the organic additive may include one or more of ethanol, methanol, ethyl tert-butyl ether (ETBE), methyl tert-butyl ether (MTBE), and methyl acetate (MeOAc).

In an exemplary embodiment, the chemical or elemental analysis, the morphology, and operational properties of an exemplary clean gasoline, the hormone-modified additive, and the metal spinel-type oxide catalyst were assessed using characterization methods including, for example, X-ray diffraction (XRD), transmission electron microscopy (TEM), Fourier-transform infrared spectroscopy (FTIR), and gas chromatography (GC), as described in examples below.

EXAMPLE 1

Synthesiz of $CuFe_2O_4$ as a Metal Spinel-Type Oxide Catalyst

In Example 1, spinel $CuFe_2O_4$ as an example of a nano-sized metal spinel-type oxide was synthesized via a sol-gel auto combustion method in the presence of fructose consistent with the teachings of the exemplary embodiments of the present disclosure. In this example, a stoichiometric amount of $Cu(NO_3)_2 \cdot xH_2O$ (about 2±0.05 gr) and $Fe(NO_3)_3 \cdot 9H_2O$ (about 7±0.05 gr) were dissolved in 20 ml of distilled water in separate containers 1 and 2, respectively, at about 50° C. Then, fructose with $Cu^{2+}$/fructose ratio of about 1:3 was dissolved in container 1 and kept for 30 min to complete dissolution of fructose and obtain a clear solution. After that, the solution of the container 2 was added to the container 1, stirred and heated up to about 200° C. for about 30 minutes. Then the final solution was evaporated and brownish gases exhausted from the solution to obtain a fluffy material. Finally, the obtained fluffy material was calcined at about 500° C. for about 3 hours. The final metal spinel-type oxide was grinded and characterized to confirm the formation of $CuFe_2O_4$ structures.

The synthesized $CuFe_2O_4$ may have a surface area about 46 $m^2/gr$. Moreover, due to the magnetic property of the synthesized catalyst, it may be possible to easily separate the synthesized catalyst from a product after the process of desulfurization.

In an exemplary embodiment, synthesized $CuFe_2O_4$ may be used as a catalyst for desulfurization of naphtha.

Also, in addition to reducing sulfur content, applying $CuFe_2O_4$ as the metal spinel-type oxide catalyst in the desulfurization step may lead to improve the quality of gasoline with increasing the octane number.

EXAMPLE 2

Desulfurization of a Light Hydrocarbon Fraction

In Example 2, the desulfurization of an oil condensate as a light hydrocarbon fraction was carried out using $CuFe_2O_4$ catalyst in presence of $H_2O_2$ as an oxidant, consistent with the teachings of the exemplary embodiments of the present disclosure. In this example, consistent with exemplary process 100 of FIG. 1A, 2% v/v of $H_2O_2$ was put in contact with the light hydrocarbon fraction of the oil condensate (with sulfur content of about 2500 ppm) in the presence of the $CuFe_2O_4$ (using various concentrations of $CuFe_2O_4$: 0.5%, 1%, 1.5%, and 2% w/v) at a temperature of 15° C. and pressure of 1 atm for about 10 minutes. Therefore, a mixed phase including a desulfurized hydrocarbon phase and a non-desulfurized hydrocarbon phase was formed where the non-desulfurized hydrocarbon phase includes sulfur-containing compounds and $CuFe_2O_4$. Then, the desulfurized hydrocarbon phase was separated from the mixed phase using decantation. Sulfur content of the desulfurized hydrocarbon phase was tested using Sulfur Analyzer RX-3605H-TANAKA-Japon. As shown in TABLE 1, sulfur content may decrease to about 23 ppm.

TABLE 1

The sulfur content of the desulfurized hydrocarbon phase using various concentrations of $CuFe_2O_4$

| $CuFe_2O_4$ concentration (w/v) | Sulfur content (ppm) |
|---|---|
| 0.5% | 114 |
| 1% | 98 |
| 1.5% | 52 |
| 2% | 23 |

EXAMPLE 3

Extraction of T3 Hormone

In Example 3, the T3 hormone was extracted pursuant to the teachings of exemplary embodiments of the present disclosure. In this case, 2-amino-3-[4-(4-hydroxy-3-iodophenoxy)-3,5-diiodophenyl] propanoic acid (T3) was extracted from the thyroid gland and secreted directly into a bloodstream based on MICRO-EIA T3 test in a solid phase competitive enzyme immunoassay (EIA). In the T3 EIA, a second antibody (goat anti-mouse IgG) was coated on microtiter well. The test sample and T3-enzyme conjugate were added to each antibody coated well. During 60-minute incubation, free T3 in a patient's sera competes with a T3-enzyme conjugate for binding sites on the coated wells. After a short incubation, the well was washed to remove any unbounded T3-enzyme. Hydrogen peroxide was applied as an enzyme chromogen. Then, tetramethylbenzidine (TMB) was added to the well and was incubated for about 15 minutes at room temperature, to reflect blue color. To terminate the reaction, $H_2SO_4$ solution of a concentration of about 1.0 N was added. Quenching of the reaction can be clearly identified through the color change of solution from blue to yellow and the enhancement in the respective absorbance. The intensity of the yellow color is inversely proportional to the concentration of free T3 in a sample. The results of the Elisa (PISHTAZ Kit) test of the T3 hormone is shown in TABLE 2. The normal range of T3 hormone in the human blood serum should be in the range of 0.3 to 1.3 ng/ml. In an exemplary embodiment, the blood sample (blank sample) has a concentration of 1.2 ng/ml.

TABLE 2

The Elisa test for T3 hormone samples

| Standards (ng/ml) | Light Absorbance |
|---|---|
| 0 | 2.4 |
| 0.5 | 1.55 |
| 1 | 1.2 |
| 2.5 | 0.7 |
| 5 | 0.4 |
| 10 | 0.2 |

EXAMPLE 4

Obtaining the T3-Modified Carbon Nanotubes

In Example 4, the carbon nanotubes (CNTs) were modified by T3, consistent with the teachings of the exemplary embodiments of the present disclosure. In this example, consistent with exemplary process 106 of FIG. 1B, 0.5 g of CNTs were primarily dispersed in an acidic mixture of $HNO_3$: $H_2SO_4$ with a ratio of 1:3 v/v, via stirring and sonication at about 70° C. for about 10 minutes to obtain a black solution. Then the obtained black solution was filtered, washed with distilled water, and dried at about 80° C. for about 8 hours to obtain —COOH functionalized CNTs. Dried —COOH functionalized CNTs were added into 10 ml of T3 solution, with concentration of 10 ng/ml and sonicated for about 30 min in acidic condition. Acidic condition was provided by adding $H_2SO_4$ to the solution. The final mixture was stirred for about 4 hours and was further sonicated for about 15 minutes. The resulting black material was finally filtered, washed, and dried at 80° C. for about 8 hours.

EXAMPLE 5

Enhancing the Octane Number of the Desulfurized Hydrocarbon Phase to Produce a Clean Gasoline In Example 5, the octane number of the desulfurized hydrocarbon phase was increased using T3-modified CNTs, consistent with the teachings of the exemplary embodiments of the present disclosure. In this example, T3-modified CNTs with three different concentrations (0, 0.5, and 1.5% (w/v) of the T3-modified CNTs) were added to the desulfurized hydrocarbon phase at room temperature to produce three samples of the clean gasoline. The octane number of the clean gasoline (both research octane number (RON) and motor octane number (MON)) was analyzed and the results are shown in TABLE 3.

TABLE 3

The RON and MON of the three samples of the clean gasoline using three different concentrations of the T3- modified CNTs.

| Concentration (w/v) | RON | MON |
|---|---|---|
| 0.5% | 95 | 89 |
| 1% | 98 | 91 |
| 1.5% | 103 | 93 |

The endpoint distillation temperature of the clean gasoline in various distillation ranges from 10% to 90% was obtained from a motor fuel analyzer FT-IR-Grabner Instrument (working standard ASTM D5845). The results are summarized in TABLE 4. As shown in TABLE 4, the endpoint distillation temperature was recorded at 218° C.

TABLE 4

The distillation temperatures of the clean gasoline in various distillation ranges (10-90%)

| Distillation Range | | Temperature (° C.) |
|---|---|---|
| 10% | Recovered | 75 |
| 50% | Recovered | 75-113 |
| 90% | Recovered | 184 |
| Endpoint | | 218 |
| Residue (% vol) | 1.5 | |

EXAMPLE 6

Material Characterizations

In this example, the results of some characterization methods performed on the $CuFe_2O_4$, the T3-modified CNTs, as well as the clean gasoline (produced as described in detail in connection with Example 1, 2, and 4) are presented.

Figure 2:
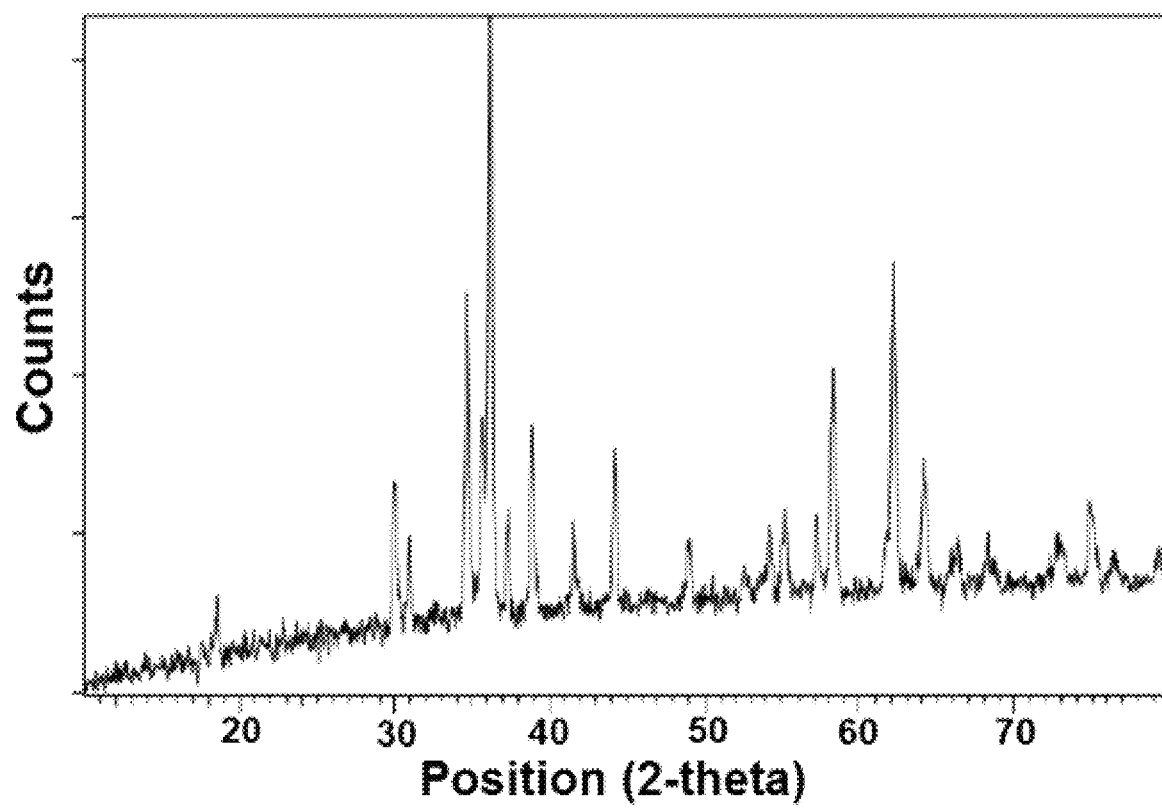
FIG. 2 illustrates an X-ray diffraction (XRD) pattern of the synthesized $CuFe_2O_4$, consistent with one or more exemplary embodiments of the present disclosure.

Referring to FIG. 2, X-ray diffraction (XRD) pattern of the synthesized $CuFe_2O_4$ is illustrated, consistent with one or more exemplary embodiments of the present disclosure. The XRD pattern confirms the formation of a pure $CuFe_2O_4$ structure in accordance with JCPDS number 06-0545. In addition, the average crystallite size was calculated using the Scherrer equation to be about 35 nm.

Figure 3:
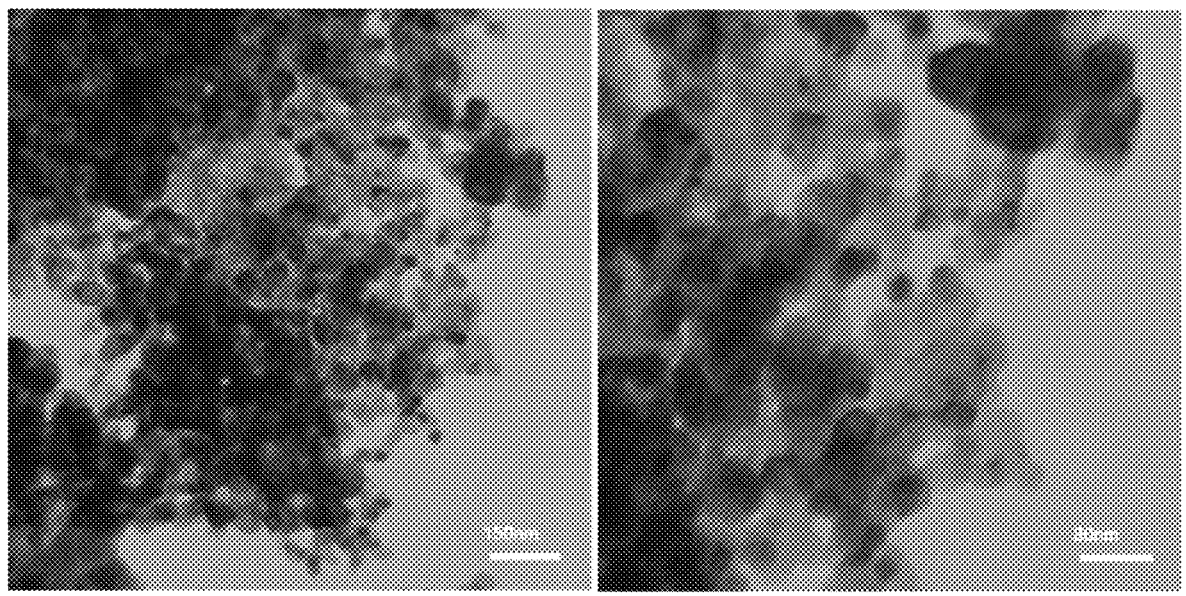
FIG. 3 illustrates a transmission electron microscopy (TEM) of the $CuFe_2O_4$ with magnifications of 150 and 80 nm, consistent with one or more exemplary embodiments of the present disclosure.

Referring next to FIG. 3, a transmission electron microscopy (TEM) of the $CuFe_2O_4$ with magnifications of 150 and 80 nm are shown, consistent with one or more exemplary embodiments of the present disclosure. The TEM images confirm the formation of $CuFe_2O_4$ particles in a nanometer range.

Figure 4:
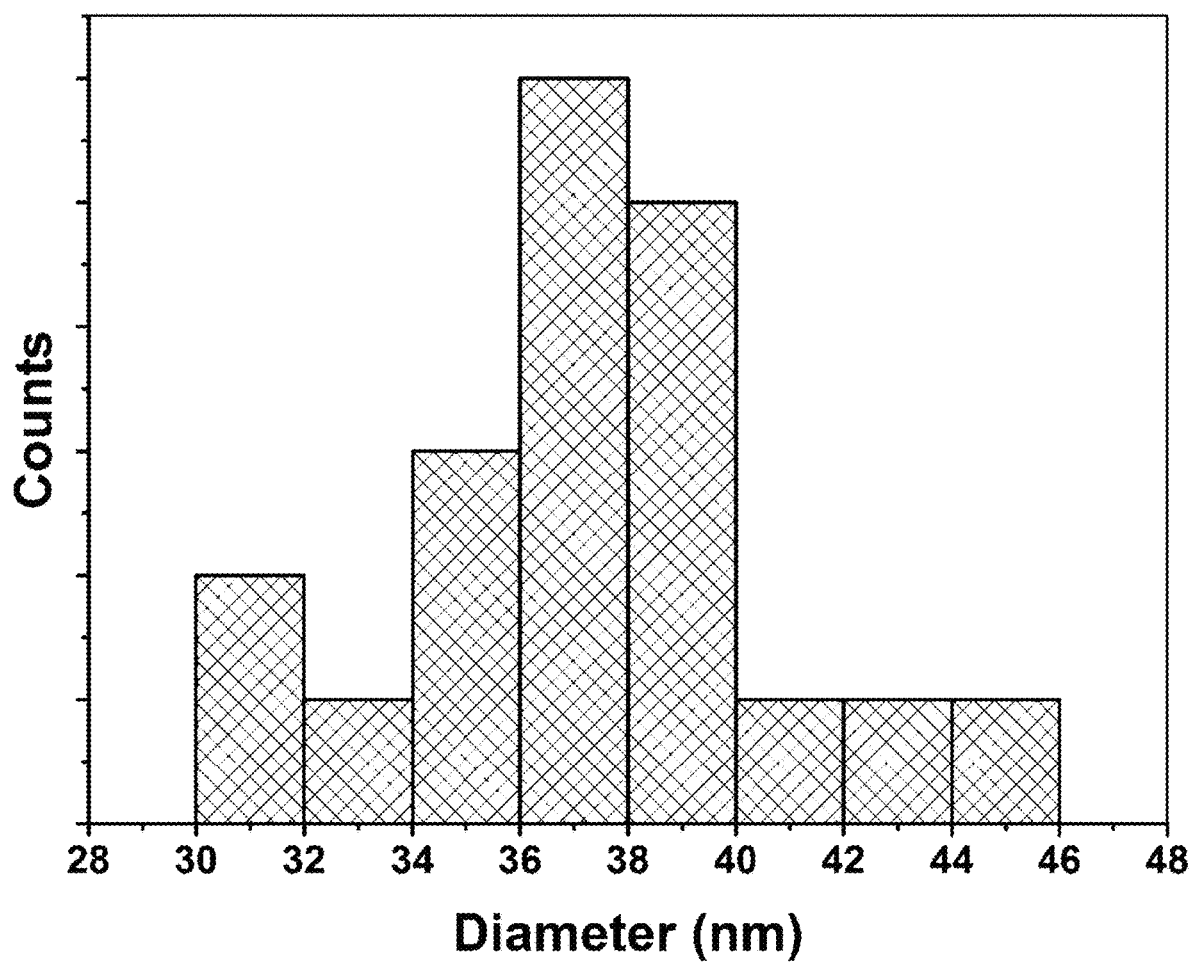
FIG. 4 illustrates an average particle size distribution of the $CuFe_2O_4$, consistent with one or more exemplary embodiments of the present disclosure.

In FIG. 4, an average particle size distribution of the $CuFe_2O_4$ is shown, consistent with one or more exemplary embodiments of the present disclosure. As shown in FIG. 4, the particle size of the $CuFe_2O_4$ is in a range of 30-46 nm, more particularly in the range of 36-38 nm.

Figure 5:
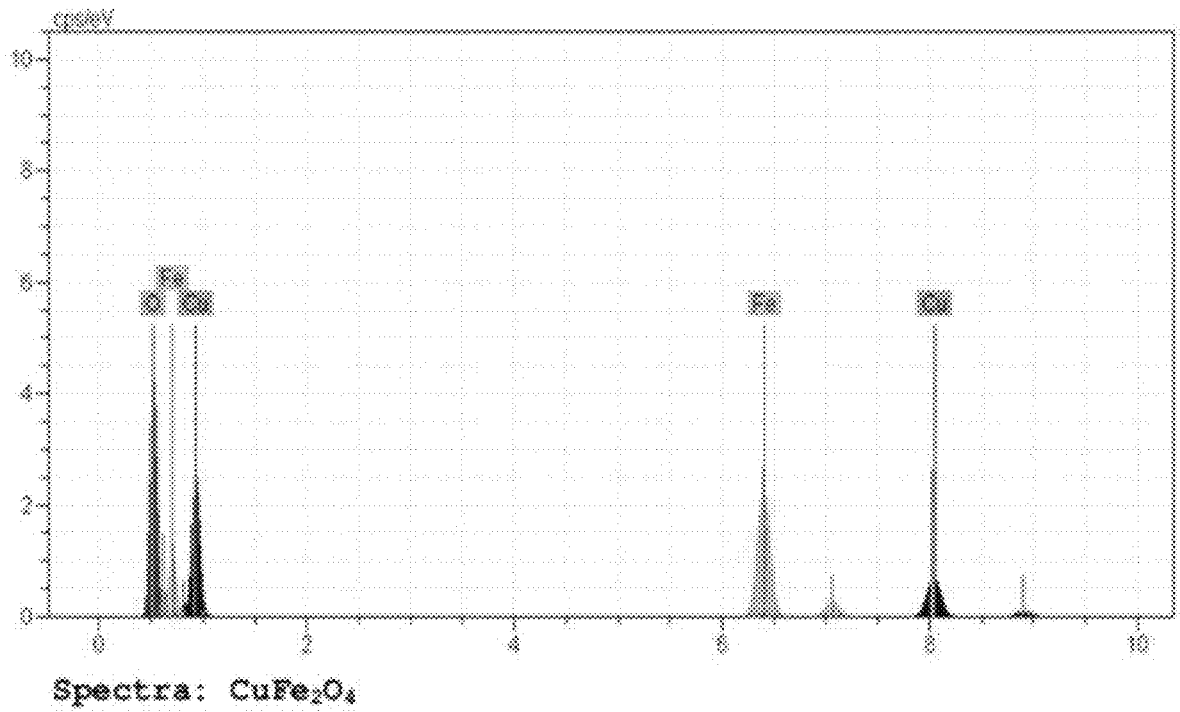
FIG. 5 illustrates an elemental analysis of the $CuFe_2O_4$, consistent with one or more exemplary embodiments of the present disclosure.

Referring now to FIG. 5, an elemental analysis of $CuFe_2O_4$ is illustrated, consistent with one or more exemplary embodiments of the present disclosure. As shown in FIG. 5, the elemental analysis of $CuFe_2O_4$ based on energy dispersive spectroscopy (EDS) confirms the presence of Cu, Fe, and O in the spectrum.

Figure 6A:
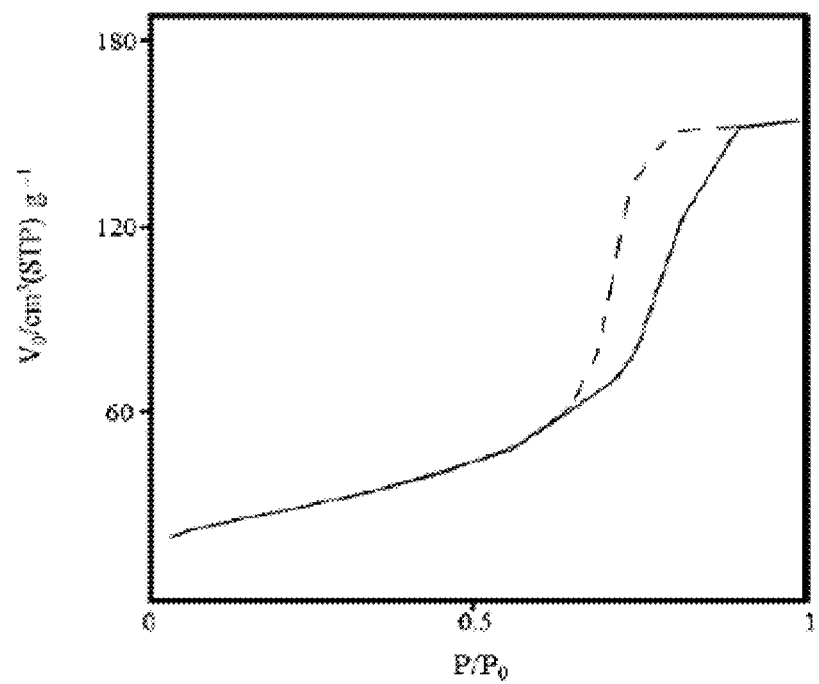
FIGS. 6A-6B illustrate a $N_2$ adsorption-desorption isotherm and a pore size distribution of the $CuFe_2O_4$ catalyst, respectively, consistent with one or more exemplary embodiments of the present disclosure.
Figure 6B:
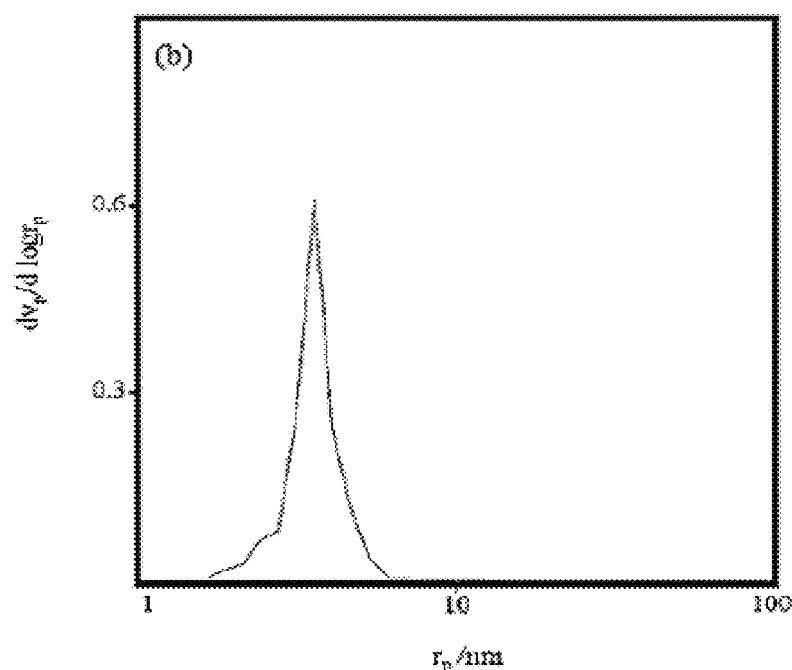

Referring next to FIGS. 6A-6B, a $N_2$ adsorption-desorption isotherm and a pore size distribution curve of the $CuFe_2O_4$ catalyst are illustrated, respectively, consistent with one or more exemplary embodiments of the present disclosure. FIG. 6A illustrates that $N_2$-adsorption-desorption isotherm of the $CuFe_2O_4$ particles. The obtained average pore diameter, specific pore volume, and specific surface area of the $CuFe_2O_4$ particles were 9.51 nm, 7.96 $cm^3/g$, and 45.67 $m^2/g$, respectively. As shown in FIG. 6B, the pore size distribution of the $CuFe_2O_4$ is in a range of 2-10 nanometers.

Figure 7:
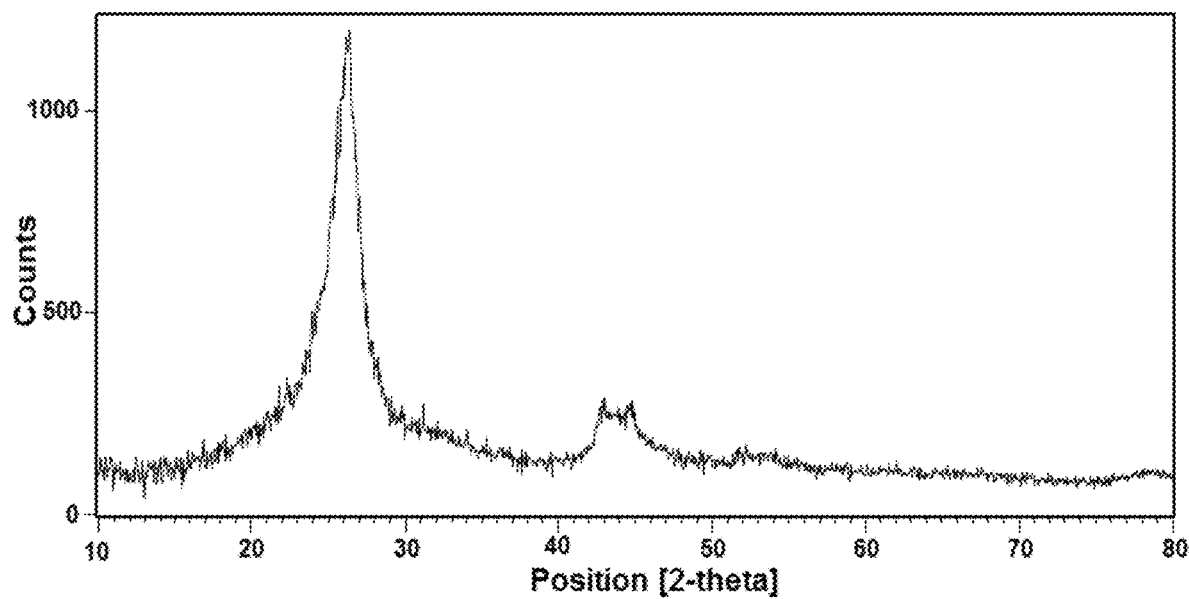
FIGS. 7-8 illustrate the XRD patterns of a non-modified CNTs and the T3-modified CNTs, respectively, consistent with one or more exemplary embodiments of the present disclosure.
Figure 8:
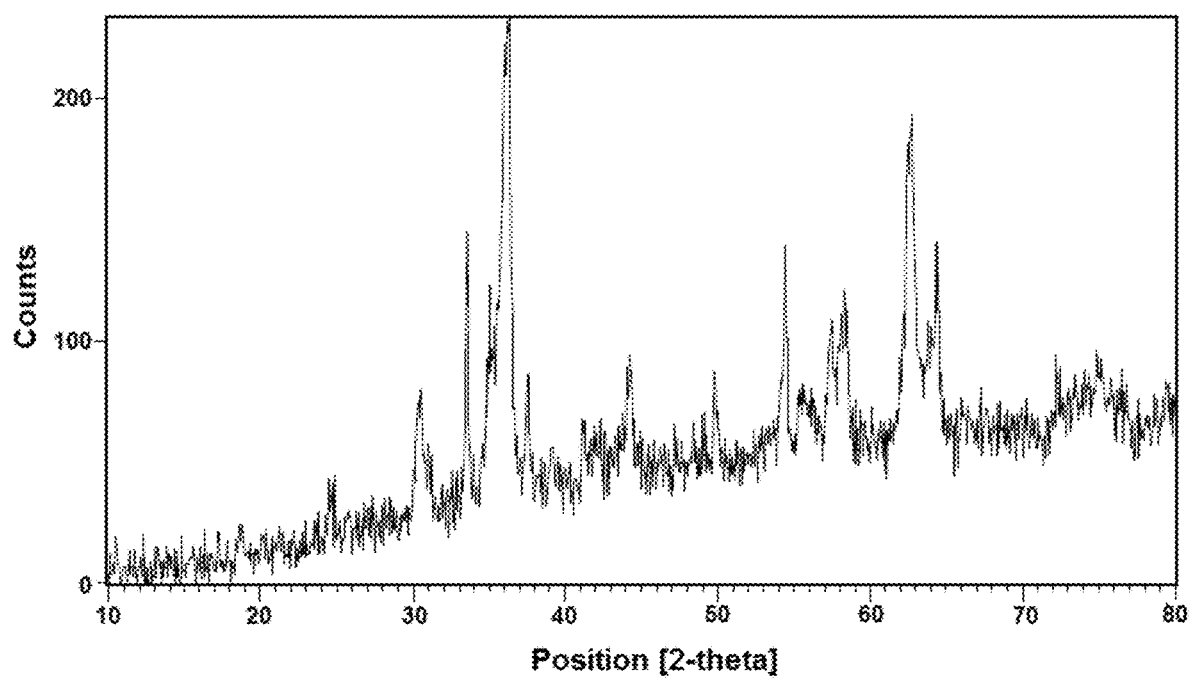

The XRD patterns of non-modified CNTs and T3-modified CNTs are shown in FIG. 7 and FIG. 8, respectively, consistent with one or more exemplary embodiments of the present disclosure. As shown in FIGS. 7-8, XRD patterns reveal a decrease in the intensity and the position of the peaks after modifying the CNTs with the T3 hormone compared with non-modified CNTs.

Figure 9:
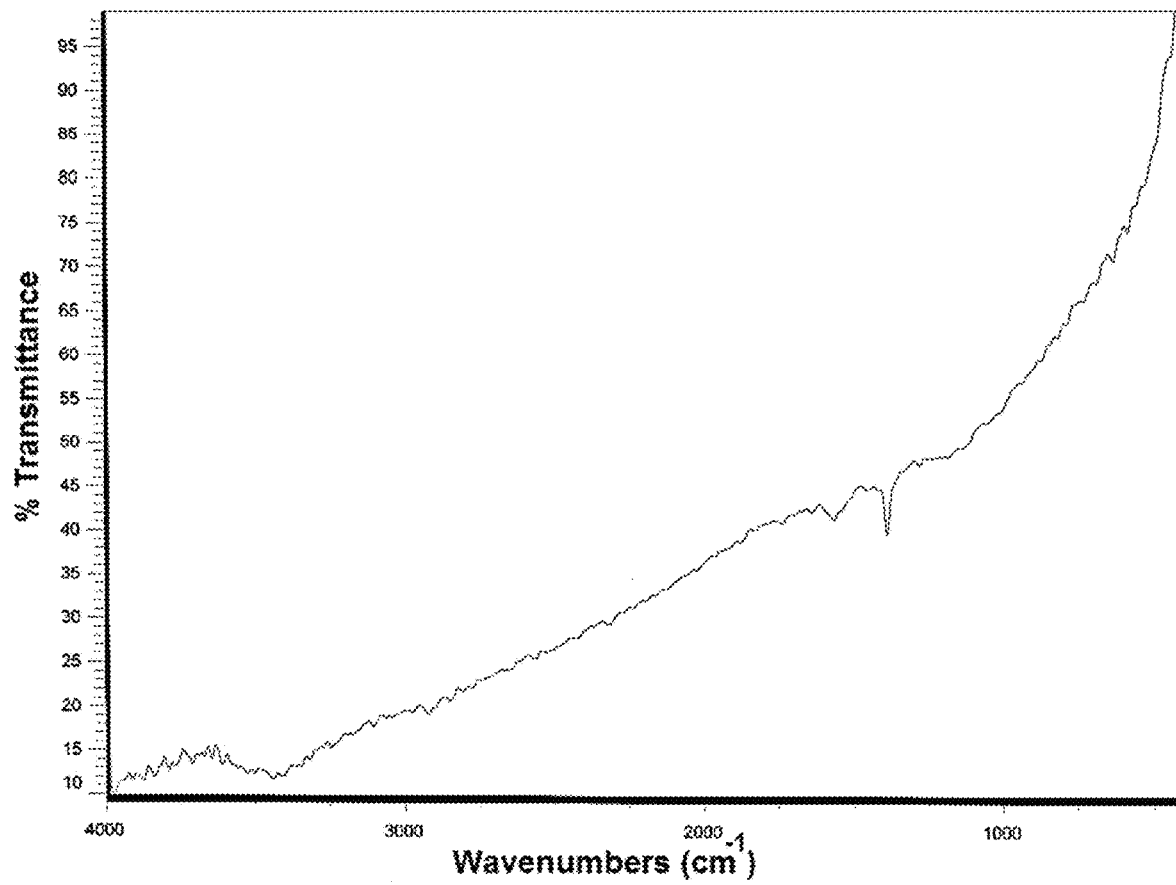
FIG. 9 illustrates a fourier-transform infrared spectroscopy (FTIR) spectrum of the non-modified CNTs, consistent with one or more exemplary embodiments of the present disclosure.

Referring next to FIG. 9, the Fourier-transform infrared spectroscopy (FTIR) spectrum of the non-modified CNTs are shown, consistent with one or more exemplary embodiments of the present disclosure. As illustrated in FIG. 9, in the FTIR spectrum of the non-modified CNTs, there are some typical bands at 3439, 1640, and 1383 $cm^{-1}$ that correspond to the stretching vibration of —OH, bonded —C=O and —C—O groups, respectively.

Figure 10:
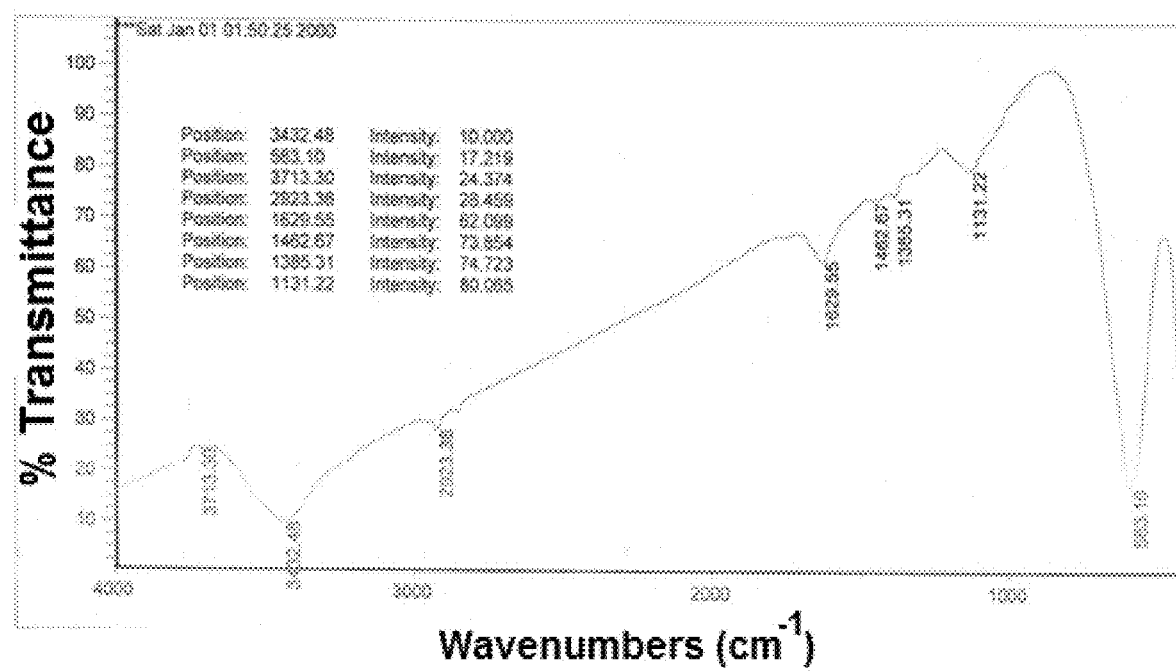
FIG. 10 illustrates a FTIR spectrum of the T3-modified CNTs, consistent with one or more exemplary embodiments of the present disclosure.

The FTIR spectrum of the T3-modified CNTs are shown in FIG. 10, consistent with one or more exemplary embodiments of the present disclosure. In the structure of the T3 hormone, there are three iodine groups that are attached to the aromatic ring. The —C—I group in the FTIR spectrum appears intensely at around 583 $cm^{-1}$. Moreover, the free primary amine groups normally appear in the range of 3400 to 3500 $cm^{-1}$. In an exemplary embodiment, the range of 3400 to 3500 $cm^{-1}$ may have the highest probability overlap with –CO(OH) group. There are two peaks at 2975 and 2923 $cm^{-1}$ which may be due to the presence of asymmetric and symmetric stretching vibration of —C—H groups, respectively. A small vibration at around 1740 $cm^{-1}$ corresponds to the vibration frequency of —C=O and a band at 1629 $cm^{-1}$ may be due to the —C=C. A stretching vibration at 1131 $cm^{-1}$ may be due to the —C—O attached to two benzene groups (phenol-O-phenol). The result shows successive loading and interaction of the T3 hormone on CNTs.

Figure 11:
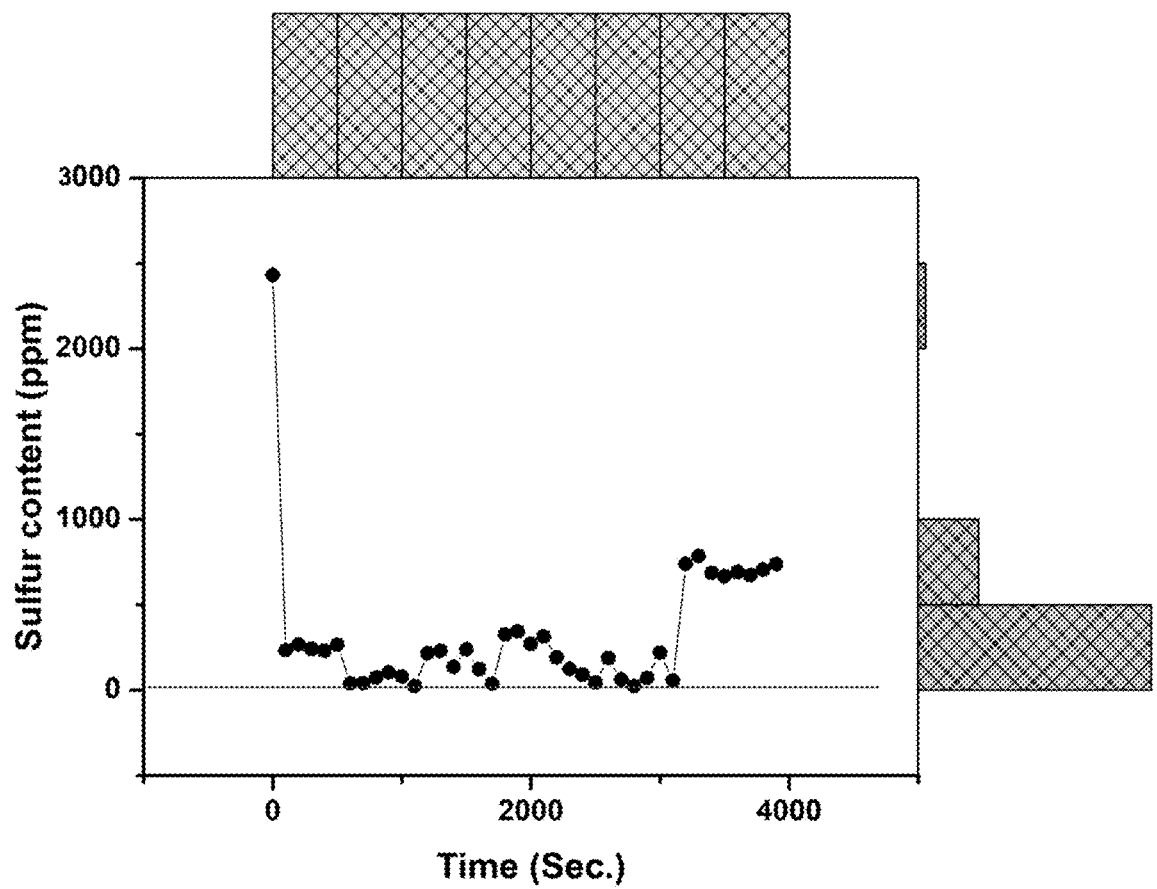
FIG. 11 illustrates the sulfur content distribution of the desulfurized hydrocarbon phase, consistent with one or more exemplary embodiments of the present disclosure.

Referring now to FIG. 11, the sulfur content distribution of the desulfurized hydrocarbon phase is shown, consistent with one or more exemplary embodiments of the present disclosure. The test was carried out every 100 seconds.

Figure 12:
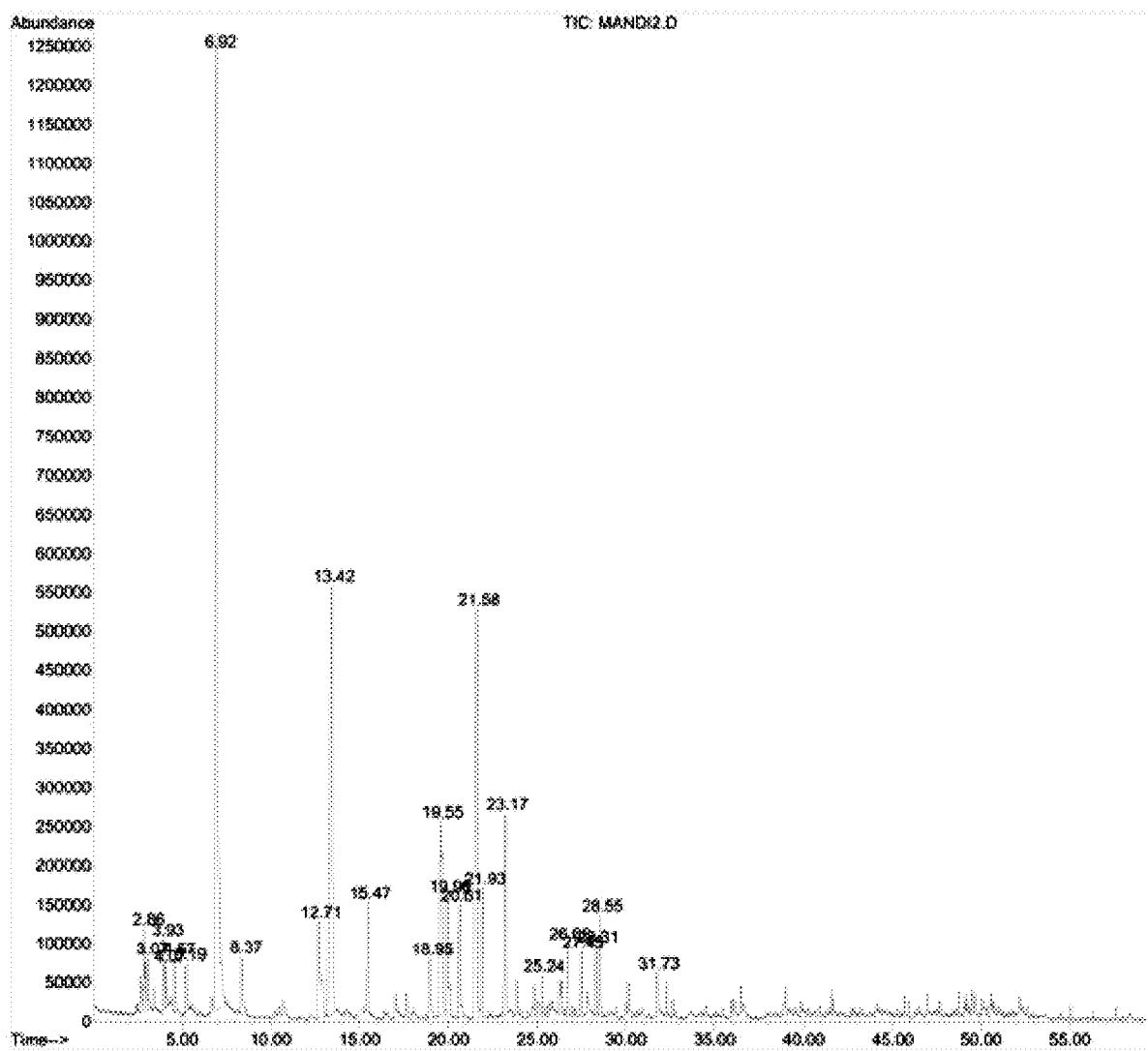
FIG. 12 illustrates the gas chromatography (GC) of the final clean gasoline product, consistent with one or more exemplary embodiments of the present disclosure.

Referring next to FIG. 12, the GC of the final clean gasoline product is shown, consistent with one or more exemplary embodiments of the present disclosure. The results reveal that the produced final gasoline utilizing exemplary approaches may not contain any harmful and poisoning material such as benzene, benzothiophene, and dibenzothiophene.

What is claimed:

1. A method for producing a clean gasoline from a light hydrocarbon fraction, the method comprising:
    forming a mixed phase by putting in contact the light hydrocarbon fraction with an oxidant in presence of a metal spinel-type oxide catalyst, the mixed phase comprising a desulfurized hydrocarbon phase and a non-desulfurized hydrocarbon phase, the non-desulfurized hydrocarbon phase comprising sulfur-containing compounds and the metal spinel-type oxide catalyst;
    producing a determined separated phase by separating the desulfurized hydrocarbon phase from the mixed phase, wherein the determined separated phase comprises a sulfur content of less than 1 percent;
    obtaining a hormone-modified additive, comprising
        producing a COOH functionalized additive by dispersing an additive in an acidic mixture, the acidic mixture including one or more of $HNO_3$ and $H_2SO_4$, the additive including carbon nanotubes; and obtaining the hormone-modified additive by adding a hormone to the COOH functionalized additive under stirring for 1 to 10 hours; and producing the clean gasoline through enhancing octane number of the desulfurized hydrocarbon phase by putting in contact the desulfurized hydrocarbon phase with the hormone-modified additive.

2. A method for producing a clean gasoline from a light hydrocarbon fraction, the method comprising:

forming a mixed phase by putting in contact the light hydrocarbon fraction with an oxidant in presence of a metal spinel-type oxide catalyst, the mixed phase comprising a desulfurized hydrocarbon phase and a non-desulfurized hydrocarbon phase, the non-desulfurized hydrocarbon phase comprising sulfur-containing compounds and the metal spinel-type oxide catalyst;

producing a determined separated phase by separating the desulfurized hydrocarbon phase from the mixed phase, wherein the determined separated phase comprises a sulfur content of less than 1 percent;

obtaining a hormone-modified additive; and producing the clean gasoline through enhancing octane number of the desulfurized hydrocarbon phase by putting in contact the desulfurized hydrocarbon phase with the hormone-modified additive comprising enhancing the octane number of the desulfurized hydrocarbon phase using one or more of triiodothyronine (T3)-modified additive, reverse triiodothyronine (rT3)-modified additive, and thyroxine (T4)-modified additive as the hormone-modified additive.

3. The method of claim 1, wherein producing the clean gasoline through enhancing the octane number of the desulfurized hydrocarbon phase by putting in contact the desulfurized hydrocarbon phase with the hormone-modified additive comprises putting in contact the desulfurized hydrocarbon phase with the hormone-modified additive, the hormone-modified additive comprises at least one of the following structural formulas (I), (II), and (III):

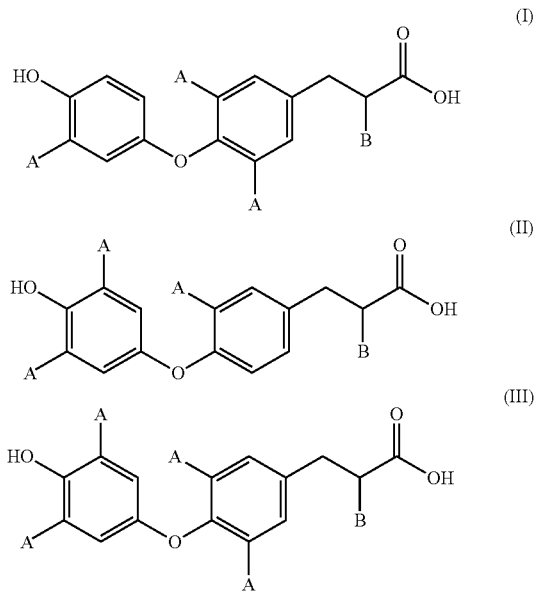

where A and B comprise a —I and a —NH$_2$, respectively.

4. A method for producing a clean gasoline from a light hydrocarbon fraction, the method comprising:

forming a mixed phase by putting in contact the light hydrocarbon fraction with an oxidant in presence of a metal spinel-type oxide catalyst, the mixed phase comprising a desulfurized hydrocarbon phase and a non-desulfurized hydrocarbon phase, the non-desulfurized hydrocarbon phase comprising sulfur-containing compounds and the metal spinel-type oxide catalyst;

producing a determined separated phase by separating the desulfurized hydrocarbon phase from the mixed phase, wherein the determined separated phase comprises a sulfur content of less than 1 percent;

obtaining a hormone-modified additive; and producing the clean gasoline through enhancing octane number of the desulfurized hydrocarbon phase by putting in contact the desulfurized hydrocarbon phase with the hormone-modified additive comprising enhancing the octane number of the desulfurized hydrocarbon phase by more than 4 octane numbers.

5. The method of claim 1, wherein producing the clean gasoline through enhancing the octane number of the desulfurized hydrocarbon phase by putting in contact the desulfurized hydrocarbon phase with the hormone-modified additive comprises putting in contact the desulfurized hydrocarbon phase with 0.5-1.5% w/v of the hormone-modified additive.

6. The method of claim 1, wherein producing the clean gasoline through enhancing the octane number of the desulfurized hydrocarbon phase by putting in contact the desulfurized hydrocarbon phase with the hormone-modified additive further comprises adding an organic additive to the desulfurized hydrocarbon phase, the organic additive includes one or more of ethanol, methanol, ethyl tert-butyl ether (ETBE), methyl tert-butyl ether (MTBE), and methyl acetate (MeOAc).

7. The method of claim 1, wherein forming the mixed phase by putting in contact the light hydrocarbon fraction with the oxidant in presence of the metal spinel-type oxide catalyst comprises forming the mixed phase at a temperature in a range of 15° C. to 77° C. and a pressure in a range of 1 atm to 2 atm for 5 to 15 minutes.

8. The method of claim 1, wherein forming the mixed phase by putting in contact the light hydrocarbon fraction with the oxidant in presence of the metal spinel-type oxide catalyst comprises putting in contact the light hydrocarbon fraction with the oxidant in presence of 0.5-2% w/v of the metal spinel-type oxide catalyst.

9. The method of claim 1, wherein forming the mixed phase by putting in contact the light hydrocarbon fraction with the oxidant in presence of the metal spinel-type oxide catalyst comprises putting in contact the light hydrocarbon fraction with the oxidant includes one or more of air, ozone, oxygen, oxides of nitrogen, peroxides, hydroperoxides, and organic peracids in presence of the metal spinel-type oxide catalyst.

10. The method of claim 1, wherein forming the mixed phase by putting in contact the light hydrocarbon fraction with the oxidant in presence of the metal spinel-type oxide catalyst comprises putting in contact the light hydrocarbon fraction includes a sulfur-containing hydrocarbon fraction with a boiling range of 30° C. to 100° C. with the oxidant in presence of the metal spinel-type oxide catalyst, the hydrocarbon fraction includes one or more of crude oil, shale oil, coal liquid, intermediate refinery products or their distillation fractions including naphtha, gas oil, vacuum gas oil, and vacuum residue.

11. The method of claim 1, wherein forming the mixed phase by putting in contact the light hydrocarbon fraction with the oxidant in presence of the metal spinel-type oxide catalyst comprises putting in contact the light hydrocarbon fraction with the oxidant in presence of the metal spinel-type oxide catalyst with a formula of $AB_2O_4$, wherein A and B include elements comprising copper, iron, nickel, and any mixture thereof.

12. The method of claim 1, further comprising regenerating the metal spinel-type oxide catalyst by treating the non-desulfurized hydrocarbon phase with at least one of hydrochloric acid and nitric acid.

13. The method of claim 1, wherein separating the desulfurized hydrocarbon phase from the mixed phase comprises separating the desulfurized hydrocarbon phase from the mixed phase by one or more of decantation or applying a magnetic field.

14. The method of claim 1, wherein the clean gasoline comprises an octane number of more than 95.

15. The method of claim 1, wherein the clean gasoline comprises a storage stability of more than 25 days.

* * * * *